US007770942B2

(12) United States Patent
Homner

(10) Patent No.: US 7,770,942 B2
(45) Date of Patent: Aug. 10, 2010

(54) LOCKING ARRANGEMENT WITH A SWIVELLING LOCKING HOOK AND A MOVABLE RETAINING ROD FOR HOOKING INTO POSITION

(75) Inventor: Bernhard Homner, Stammheim (DE)

(73) Assignee: S-Fasteners GmbH, Magstadt (DE)

( * ) Notice: Subject to any disclaimer, the term of this patent is extended or adjusted under 35 U.S.C. 154(b) by 32 days.

(21) Appl. No.: 11/950,630

(22) Filed: Dec. 5, 2007

(65) Prior Publication Data

US 2008/0157543 A1 Jul. 3, 2008

(30) Foreign Application Priority Data

Jan. 2, 2007 (DE) .................. 20 2007 000 112 U

(51) Int. Cl.
*F16J 3/00* (2006.01)

(52) U.S. Cl. ........................ 292/95; 292/110; 292/102; 292/220; 292/340

(58) Field of Classification Search .................. 292/95, 292/110, 121, 122, 96, 102, 108, 56, 219, 292/220, 159, 169, 140, 150, 153, 340, 341.15, 292/341.13, 341.19, 125, 128, 225, 228, 292/304, DIG. 46, DIG. 68, DIG. 55
See application file for complete search history.

(56) References Cited

U.S. PATENT DOCUMENTS

| | | | | |
|---|---|---|---|---|
| 309,181 | A | 12/1884 | Woodrich | |
| 1,093,637 | A | 4/1914 | Lint | |
| 3,266,831 | A * | 8/1966 | Banse | 292/133 |
| 3,571,977 | A | 3/1971 | Abeel | |
| 4,495,380 | A | 1/1985 | Ryan et al. | |
| 4,686,783 | A | 8/1987 | Bourquard et al. | |
| 4,805,366 | A | 2/1989 | Long | |
| 4,987,714 | A | 1/1991 | Lemke | |

(Continued)

FOREIGN PATENT DOCUMENTS

| | | |
|---|---|---|
| DE | 1860948 U | 10/1962 |

(Continued)

OTHER PUBLICATIONS

U.S. Appl. No. 11/950,643, Homner, Entire Document.

(Continued)

*Primary Examiner*—Peter M. Cuomo
*Assistant Examiner*—Mark Williams
(74) *Attorney, Agent, or Firm*—Woodling, Krost and Rust

(57) ABSTRACT

The releasable locking arrangement for two components consists of a hook-connecting element arranged on a first component (10) and a spring-loaded locking hook (26) with swivelling axis (22) arranged on a second component (20). The locking hook (21) and the hook-connecting element can be connected with one another to form the lock. The hook-connecting element on the first component (10) is a retaining rod (11) whose ends are movable in a guide track (12, 12'). The swivelling axis (22) of the locking hook (21) on the second component (20) is connected with a holder (27). The holder (27) has a sliding bevel (24-S, 25-S) for the retaining rod (11). When the two components (10, 20) approach one another, the retaining rod (11) slides upwards on the sliding bevel (24-S, 25-S) of the holder. This causes the retaining rod to move in its guide track (12, 12') at the same time.

1 Claim, 5 Drawing Sheets

U.S. PATENT DOCUMENTS

| | | | | |
|---|---|---|---|---|
| 5,036,674 | A | | 8/1991 | Chang |
| 5,217,339 | A | | 6/1993 | O'Connor |
| 5,308,205 | A | | 5/1994 | Lautenschlager |
| 5,426,905 | A | | 6/1995 | Rollhauser |
| 5,529,369 | A | * | 6/1996 | Welborn .................. 296/146.1 |
| 5,626,450 | A | | 5/1997 | Ferrari et al. |
| 5,655,801 | A | * | 8/1997 | Casey ......................... 292/210 |
| 5,782,511 | A | | 7/1998 | Schwarz |
| 6,149,210 | A | | 11/2000 | Hunt |
| 6,409,446 | B1 | | 6/2002 | Schwarz |
| 6,442,806 | B1 | | 9/2002 | Wesson |
| 6,443,679 | B1 | | 9/2002 | Schwarz |
| 6,497,436 | B1 | | 12/2002 | Deblock |
| 6,679,530 | B2 | * | 1/2004 | Krynski ...................... 292/210 |
| 6,736,438 | B1 | * | 5/2004 | Wieclawski ................ 296/24.3 |
| 6,837,661 | B2 | | 1/2005 | Schwarz et al. |
| 6,846,125 | B2 | | 1/2005 | Smith et al. |
| 6,866,227 | B2 | | 3/2005 | Pratt |
| 6,908,144 | B2 | | 6/2005 | Gotzinger et al. |
| 7,107,697 | B2 | | 9/2006 | Schwarz et al. |
| 7,179,039 | B2 | | 2/2007 | Schwarz et al. |
| 7,234,209 | B2 | | 6/2007 | Totani et al. |
| 2002/0017009 | A1 | | 2/2002 | Smith et al. |
| 2004/0115030 | A1 | | 6/2004 | Schwarz |
| 2004/0240933 | A1 | | 12/2004 | Schwarz et al. |
| 2007/0147975 | A1 | | 6/2007 | Homner |
| 2007/0158955 | A1 | | 7/2007 | Homner |
| 2008/0150301 | A1 | | 6/2008 | Homner |
| 2008/0273922 | A1 | | 11/2008 | Homner |

FOREIGN PATENT DOCUMENTS

| | | | |
|---|---|---|---|
| DE | 3145155 | A1 | 11/1981 |
| DE | 8710288 | U1 | 10/1987 |
| DE | 3623311 | A1 | 1/1988 |
| DE | 3922025 | C1 | 9/1990 |
| DE | 4239908 | C1 | 3/1994 |
| DE | 19707634 | A1 | 10/1997 |
| DE | 29808914 | U1 | 9/1998 |
| DE | 29914145 | U1 | 12/2000 |
| DE | 10040410 | A1 | 1/2001 |
| DE | 19943083 | A1 | 12/2001 |
| DE | 20218302 | U1 | 3/2003 |
| DE | 10355780 | A1 | 6/2005 |
| DE | 102004011183 | A1 | 9/2005 |
| DE | 102006008655 | A1 | 9/2006 |
| DE | 202006019165.8 | | 8/2007 |
| DE | 202007000112.6 | | 8/2007 |
| EP | 0189569 | B1 | 2/1989 |
| EP | 0784141 | A1 | 7/1997 |
| EP | 06026133 | | 3/2007 |
| EP | 07004742 | | 5/2007 |
| EP | 07024364 | | 6/2008 |
| EP | 07024365 | | 6/2008 |
| GB | 1268022 | | 3/1972 |
| GB | 1506902 | | 4/1978 |
| GB | 2050487 | A | 1/1981 |
| GB | 2219342 | A | 12/1989 |
| JP | 2000310210 | A | 7/2000 |
| WO | 80/00162 | A1 | 2/1980 |

OTHER PUBLICATIONS

U.S. Appl. No. 11/682,099, Homner, Entire Document.

U.S. Appl. No. 12/478,490 Inventor: Homner; F/D: Jun. 4, 2009.

* cited by examiner

LOCKING ARRANGEMENT WITH A SWIVELLING LOCKING HOOK AND A MOVABLE RETAINING ROD FOR HOOKING INTO POSITION

This application claims priority to German Utility Model Application DE 2007 000112.6, filing date Jan. 2, 2007.

The invention refers to mechanical locking arrangements where a swivelling locking hook hooks into a hook-connecting element, hooking around it to form the lock.

Locking arrangements of this kind are described in, for example, the German utility model no. 298 08 914.9, which are suitable, among other things, for locks for luggage boxes in aircraft. Such a locking arrangement provides a locking catch joined to a container and a swivelling locking hook attached to a hinged cover. The hooked part of the locking hook hooks around the locking catch to form the lock.

In aircraft construction, such locks are subject to high requirements. For example, they must withstand high strains while remaining low in weight and size.

The components to be connected such as containers and covers may however be in a different position with reference to one another to the position required. Such differences may be attributable to tolerances in the components themselves or tolerances in assembly. Such differences may cause the locking hook on the cover to be insufficiently well aligned with the hook-connecting element on the container to permit secure locking.

For this reason, the purpose of the invention is to provide a locking arrangement which compensates certain differences in the positioning of the locking hook and the component carrying the hook-connecting element, thereby ensuring a secure lock.

For clarification of the purpose, reference is made to FIGS. 5A and 5B.

Both components B1' and B2' are positioned with reference to one another in such a way that locking cannot take place between the hooked part V2'-1 of the locking hook and the retaining rod H1' because the two components B1' and B2' are displaced ("in height") (e.g. by the distance d) with reference to one another.

Figure 5B:
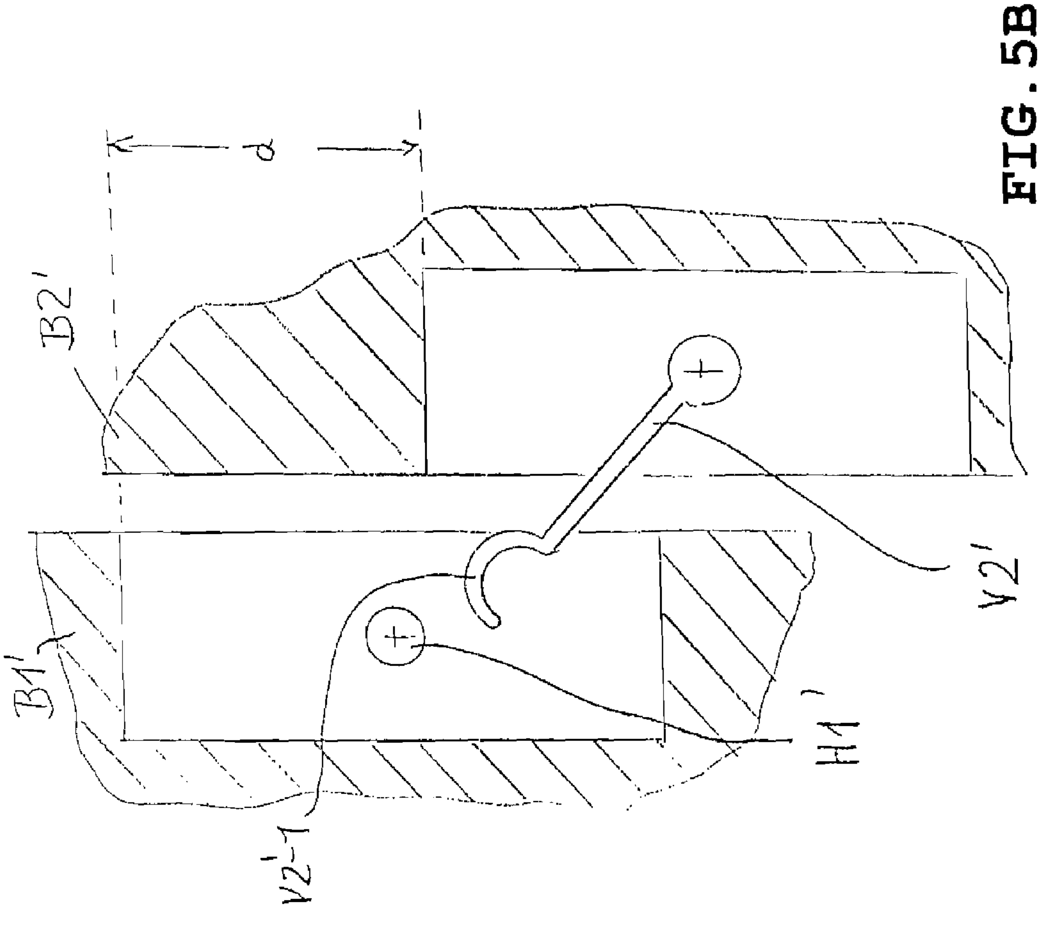
FIG. 5B shows a first component B1' with a retaining rod H1' and a second component B2' with a swivelling locking hook V2'.
Figure 5A:
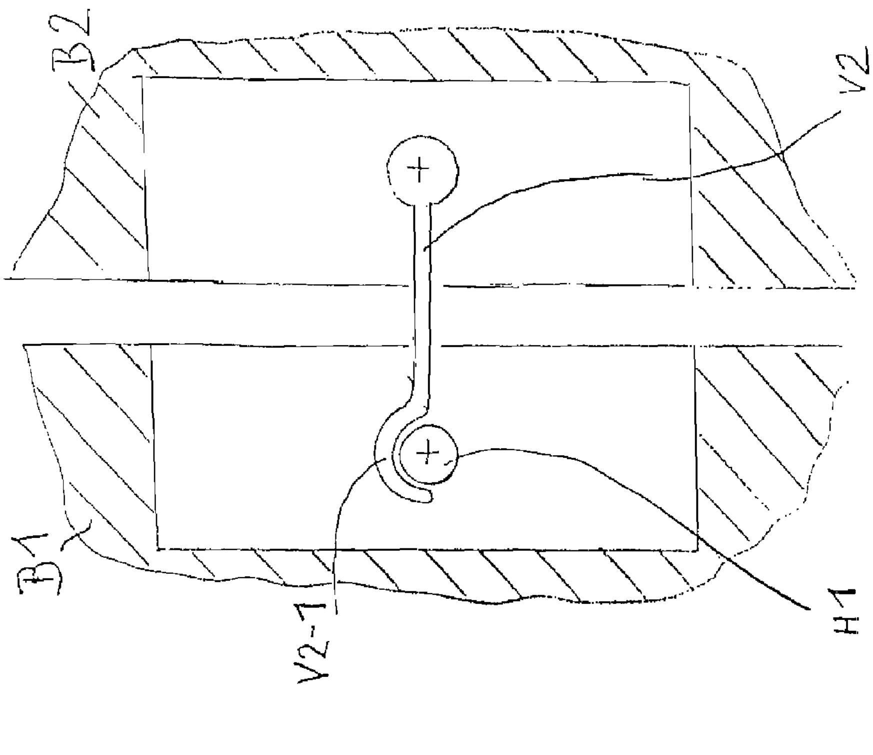
FIG. 5A shows a first component B1 with a retaining rod H1 and a second component B2 with a swivelling locking hook V2. Both components B1 and B2 are positioned with reference to one another in such a way that the hooked part V2-1 of the locking hook V2 hooks sufficiently around the retaining rod H1 in order to close the lock.

A problem of the kind shown in FIG. 5B may be produced in practice by tolerances in the component and/or in assembly. This may make locking difficult, insecure or even impossible.

The purpose of the invention is fulfilled advantageously by the characteristics described in claim 1. Advantageous modifications of the invention are described in the sub-claims.

In order to fulfil the purpose of the invention, the retaining rod is located movably in a guide track in one of the components. The locking hook on the other component is shaped and arranged specially in a holder with a sliding bevel for the retaining rod.

This produces a secure lock between the hooked part of the locking hook and the retaining rod even when the components are displaced in height with reference to one another as shown in FIG. 5B.

A practical application of the invention is shown in the drawings and is described in more detail below.

FIG. 1

A perspective exploded view of the locking arrangement according to invention with a locking hook and a movable retaining rod as hook-connecting element.

FIG. 2A

A perspective partially exploded view of the movable retaining rod and a holder with sliding bevels for the retaining rod.

FIG. 2B

A perspective partial view of the retaining rod in an initial position on the sliding bevel of the holder.

FIG. 2C

A perspective partial view of the locking rod in a final position on the sliding bevel of the holder.

FIG. 3

Figure 1:
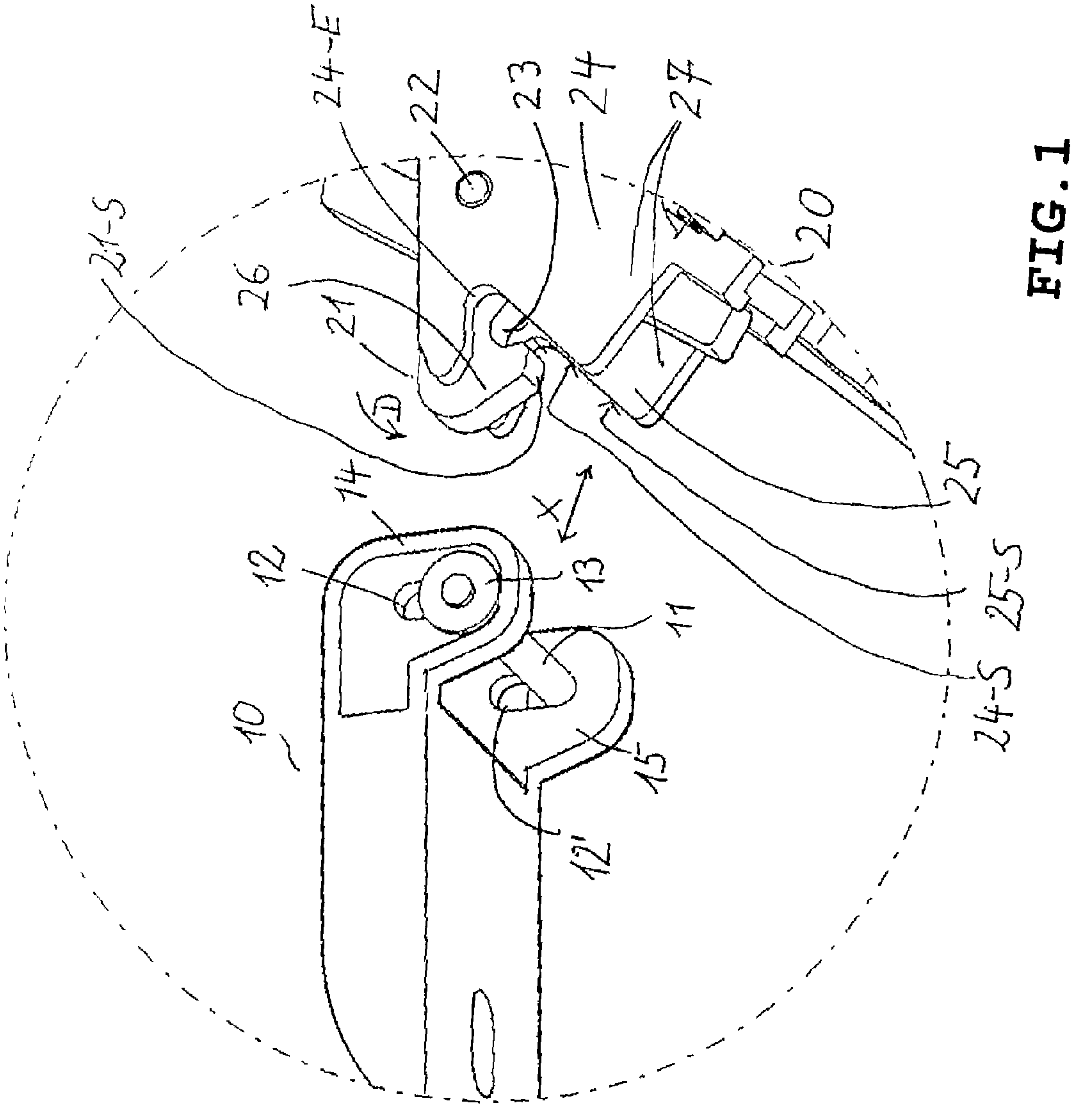

A perspective partially exploded view of the locking hook and the retaining rod according to FIG. 1.

FIG. 4A

A partial side view of the holder, the locking hook and the retaining rod, where the retaining rod is in a position in the central area of the holder-sliding-bevel and in a position in front of the outer hook-sliding-bevel of the locking hook which is still lowered.

FIG. 4B

A partial side view of the locking hook and the retaining rod in the locking position.

FIG. 5A, FIG. 5B

A schematic view to illustrate the purpose of the invention.

FIG. 5A

Component with locking rod and component with locking hook aligned with one another in locking position.

FIG. 5B

Component with locking rod and component with locking hook displaced with reference to one another so that no locking is possible.

FIG. 1 shows A perspective exploded view of the locking arrangement according to invention with a locking hook 21 and a movable retaining rod 11 as hook-connecting element. The retaining rod 11 is located on a first component 10 and the locking hook 21 with swivelling axis 22 on a second component 20.

The lock is created by the hooked part 26 of the locking hook 21 which hooks around the retaining rod 11. This lock can however be released.

The retaining rod 11 is arranged with each of its ends in a guide slot 12, 12'. The limited guide slots run in a straight line in wall elements 14, 15 at a distance from one another. Slots running in curved lines are also possible. The outer ends of the rod (11) are connected to disks (13) 12' which prevent the retaining rod 11 from dropping out of the guide slots.

The locking hook 21 is located between the two wall elements 24 and 25 of a holder 27 on the component 20. The ends of the swivelling axis 22 of the locking hook 21 are 22 connected with these wall elements.

The wall elements 24 and 25 of the holder each have a rising sliding bevel 24-S and 25-S for the retaining rod 11. At their upper end, the sliding bevels have a catch-shaped stop 24-E.

When the first component 10 with the retaining rod 11 and the second component 20 with the locking hook 21 and the holder 27 with the sliding bevels move towards one another in direction X, the retaining rod 11 strikes the lower part of the sliding bevel 24-S and 25-S. With continuing movement of the two components toward one another, the retaining rod 11 is pushed upwards until it reaches the stop 24-E. This displacement of the retaining rod 11 on the sliding bevel 24-S, 25-S is accompanied by a simultaneous upward displacement of the retaining rod 11 in its guide slot 12, 12'.

The locking hook 21 is pre-tensioned by spring F (FIG. 3) in direction D.

The swivelling plane of the locking hook 21 runs adjacent to the sliding bevel 24-S, 25-S of the holder. The locking hook 21 is positioned between the wall elements 24 and 25 of the holder 27 in such a way that, when it is displaced upwards, the retaining rod 11 strikes the sliding bevel 24-S, 25-S on the hooked part 26 of the locking hook 21. This hooked part 26 has an outer hook sliding surface 21-S. When the retaining rod 11 applies pressure to this hook sliding surface 21-S during its upward movement, the locking hook is pressed against the force of the spring acting in direction D. In doing so, the locking hook executes a small swivelling movement around its own axis.

The retaining rod 11 is then pushed "beneath" the hooked part 26 of the locking hook 21.

When the retaining rod 11 is displaced further on the holder sliding bevel 24-S, 25-S the retaining rod 11 is pushed directly under the recess 23 of the hooked part 26. In this position, the hooked part 26 is forced by spring force in direction D directly into the locking position on the retaining rod 11.

Details of this locking process are described in more detail in connection with the FIGS. 2A, 2B, 2C, 3, 4A and 4B.

Figure 2A:
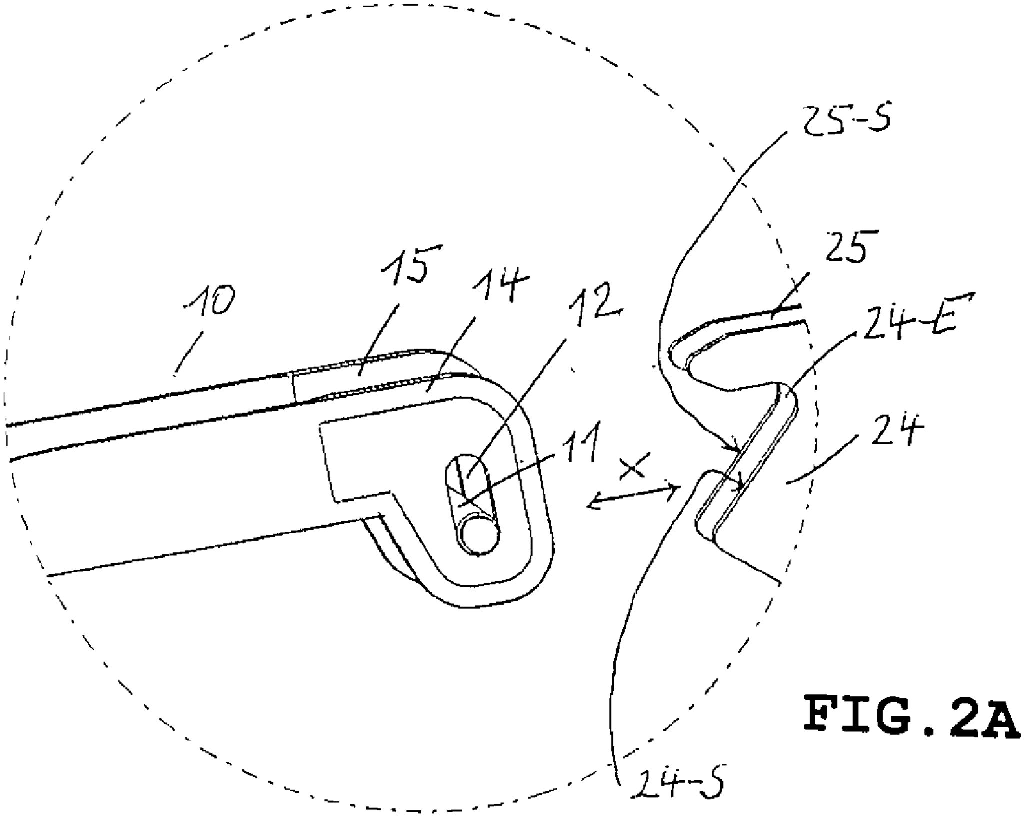

FIG. 2A shows a perspective partially exploded view of the retaining rod 11 on the first component and the holder 27 on the second component 20.

The retaining rod 11 is arranged movably in the guide slots 12, 12' of two wall elements 14, 15 at a distance from one another. The holder 27 comprises two wall elements 24, 25 at a distance from one another with sliding bevels 24-S, 25-S for the retaining rod 11.

The retaining rod 11 is in the lower position in the guide slots before the components 10 and 20 move towards one another in direction X.

FIG. 28 shows a perspective partial view of the retaining rod 11 striking the lower area of the sliding bevel 24-S, 25-S of the holder 27.

When the two components continue to approach one another in direction X, the retaining rod 11 is pushed upwards on the sliding bevel 24-S, 25-S in direction U. At the same time (not shown), the retaining rod is displaced upwards in its guide slots 12, 12' (no other movement is possible) (see FIG. 2A). Without taking the locking hook 21 arranged between the wall elements 24, 25 of the holder 27 into account, the upward movement of the retaining rod 11 on the sliding bevel would be limited by the catch-shaped stop 24-E.

In the same way, the possible movement of the retaining rod is restricted by the closed ends of its guide slots 12, 12'.

Figure 3:
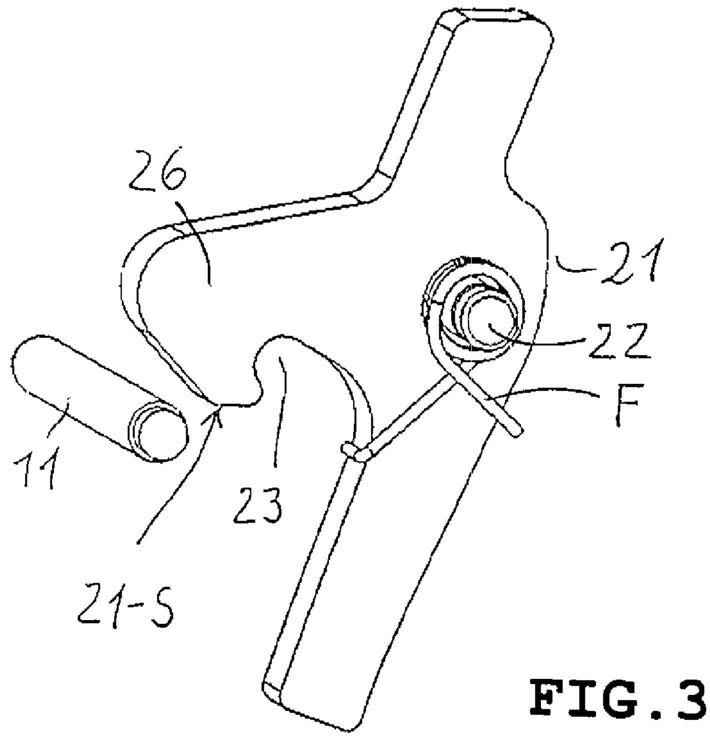
Figure 2B:
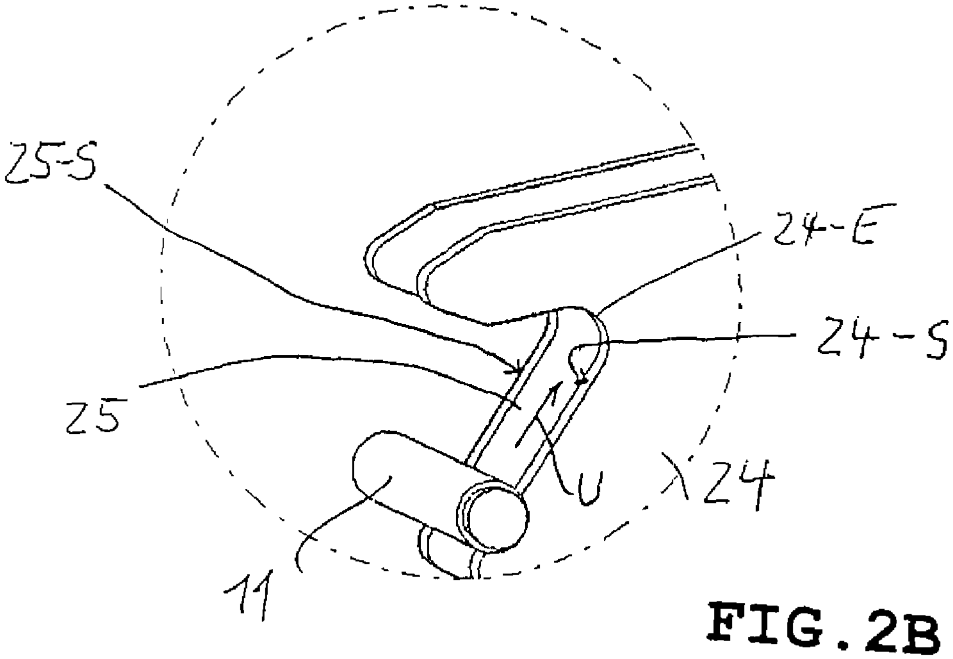
Figure 2C:
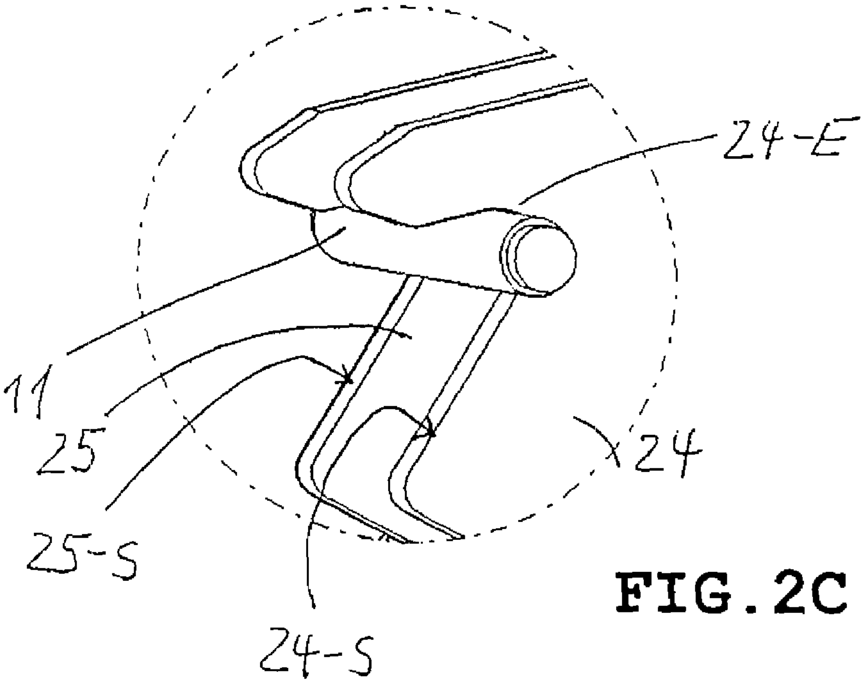

FIG. 3 shows a perspective partially exploded view of the locking hook 21 and the retaining rod 11 according to FIG. 1. The locking hook 21 is pre-tensioned in swivel direction by a leg spring F arranged on its swivelling axis 22. One leg of the spring lies against the locking hook and the other on the holder 27 (not shown).

The locking hook has a hooked part 26 with a recess 23. The retaining rod 11 is located in locking position in this recess 23 of the hooked part 26. To form the lock, it is sufficiently embraced by the hooked part 26.

Figure 4A:
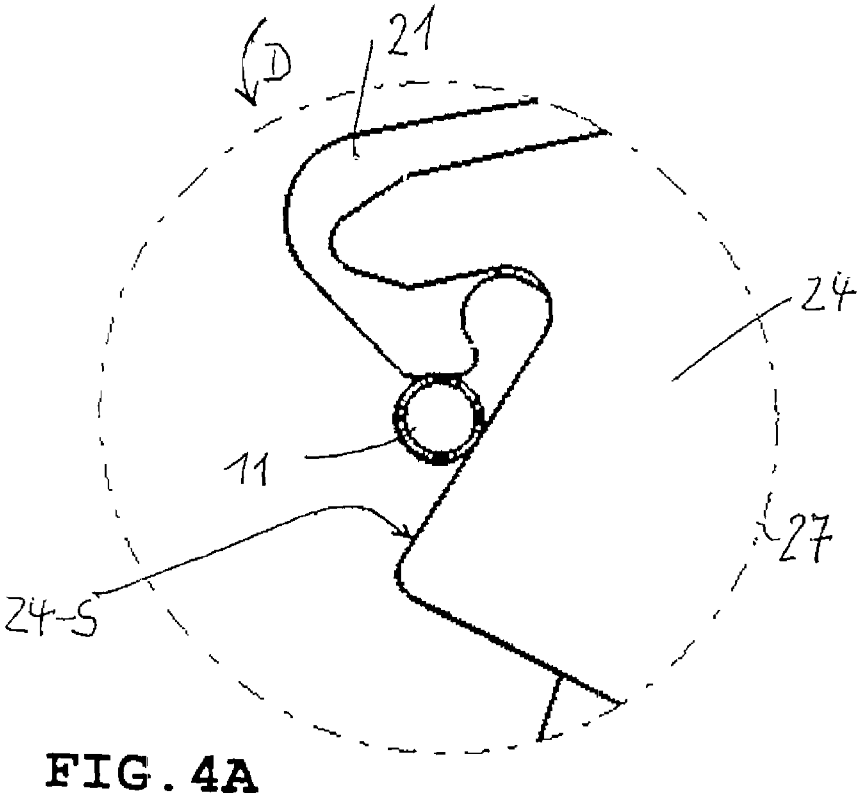

FIG. 4A shows a partial side view of the holder 27 (looking towards the wall element 24) with the locking hook 21 and the retaining rod 11. The retaining rod is in a position on the holder-sliding-bevel 24-S directly in front of the outer hook-sliding-bevel 21-S of the locking hook 21 which is still lowered.

In this position, the retaining rod, which is still movable on the holder-sliding-bevel 24-S, presses against the hook-sliding-bevel 21-S in such a way that the locking hook swivels upwards against the force of the spring (F) acting in direction D, thereby pushing the retaining rod on sliding bevel 24-S under the hooked part 26 of the locking hook 21. When it is displaced further, the retaining rod 11 (see FIG. 4B) is pushed directly under the recess 23 of the hooked part 26 and the force of the spring (F) acting in direction D forces the locking hook 21 further downwards.

In this way, the retaining rod 11 enters the recess 23 of the hooked part 26, i.e. into the locked position with the locking hook 21.

Figure 4B:
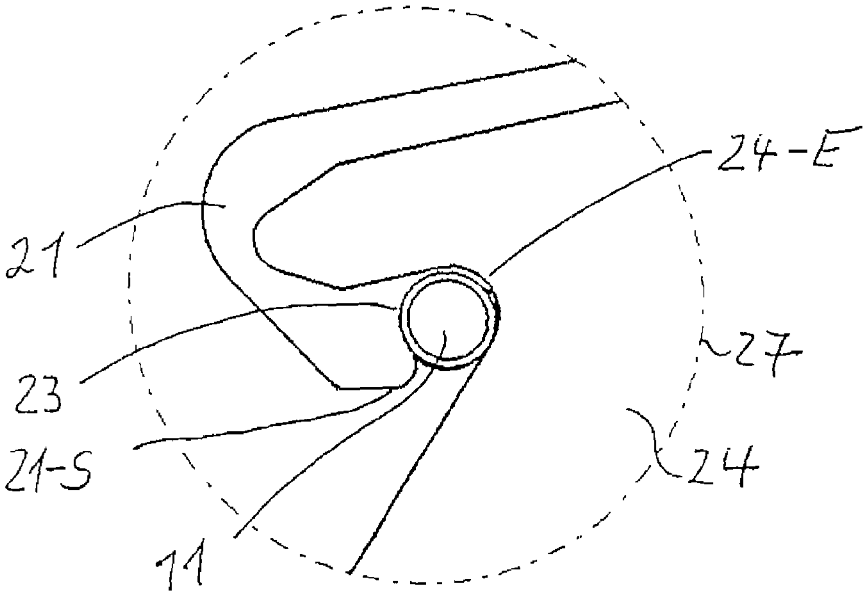

In this connection, FIG. 4B shows a partial side view of the retaining rod 11 in the locked position with the locking hook 21.

Independently of the variations of the invention described in the figures, it should be noted that the guide slot 12, 12' may not only be straight but also curved.

In place of the guide slot, a groove-shaped recess may, for example, also be provided in the wall parts 14, 15. Similarly, the holder-sliding-bevel 24-S, 25-S does not have to be straight but may also be curved in shape. However, its shape must correspond to that of the guide slot or guide groove.

The stops 24-E on the holder-sliding-bevel 24-S are dispensable.

They serve only to provide additional security in the positioning of the retaining rod.

Retaining rod 11 and holder 27 with locking hook may be attached directly to (for example) a container or a hinged cover of such a container. According to the application described, it is however also possible to locate retaining rod 11 and holder 27 with locking hook on a mounting element (10, 20) which is then fixed to the container or its cover.

The invention claimed is:

1. A releasable locking arrangement, comprising:

a first movable component;

said first movable component includes a retaining rod, said retaining rod includes first and second end portions;

said first movable component includes first and second spaced apart wall elements;

said first spaced apart wall element of said first movable component includes a first guide track, said first guide track includes an upper portion and a lower portion;

said second spaced apart wall element of said first movable component includes a second guide track; said second guide track includes an upper portion and a lower portion;

said first end portion of said retaining rod slidingly engages said first guide track of said first spaced apart wall element of said first movable component;

said second end portion of said retaining rod slidingly engages said second guide track of said second spaced apart wall element of said first movable component;

a first disk for restraining said first end portion of said retaining rod within said first guide track and a second disk for restraining said second end portion of said retaining portion within said second guide track;

said first disk affixed to said first end portion of said retaining rod;

said second disk affixed to said second end portion of said retaining rod;

a second component;

said first and second components being vertically misaligned;

said first movable component and said second component being releasably locked and unlocked from each other;

said second component includes first and second spaced apart holders, said first spaced apart holder includes a first sliding bevel, said second spaced apart holder includes a second sliding bevel, and, said first spaced apart holder includes an aperture therein;

said first spaced apart holder includes a generally v-shaped opening terminating in a catch-shaped stop;

said second spaced apart holder includes a generally v-shaped opening terminating in a catch-shaped stop;

said second component includes a locking hook;

said locking hook includes a pivot member, a hook-shaped portion, and, a generally flat outer hook sliding surface;

said hook-shaped portion of said locking hook includes a recess for capturing said retaining rod, said locking hook resides partially within said first and second spaced apart holders;

said pivot member of said locking hook interengages said aperture of said first spaced apart holder such that said locking hook is limitedly rotatable with respect to said first spaced apart holder between a first retaining rod locking position and a second retaining rod receiving position;

a spring, said spring operating between said locking hook and said first spaced apart holder biasing said locking hook with respect to said first spaced apart holder to said first retaining rod locking position;

during locking engagement of said first and second components said first component and said retaining rod are urged toward said second component, said retaining rod being simultaneously urged into sliding engagement with said first and second sliding bevels of said first and second spaced apart holders of said second component, said retaining rod engages said generally flat outer hook sliding surface of said locking hook urging and rotatably moving said locking hook upwardly displacing said locking hook from said first retaining rod locking position against the force of said spring, said retaining rod urging and moving said locking hook into said second retaining rod receiving position, said retaining rod sliding and moving into said recess of said hooked shaped portion of said locking hook, said spring moves and returns said locking hook to said first retaining rod locking position when said retaining rod resides in said recess, and, said recess of said hook shaped portion of said locking hook in said first retaining rod locking position and said catch-shaped stops of said first and second spaced apart holders secure said retaining rod locking said first and second components together.

* * * * *

UNITED STATES PATENT AND TRADEMARK OFFICE

CERTIFICATE OF CORRECTION

PATENT NO. : 7,770,942 B2
APPLICATION NO. : 11/950630
DATED : August 10, 2010
INVENTOR(S) : Bernhard Homner It is certified that error appears in the above-identified patent and that said Letters Patent is hereby corrected as shown below:

Column 2, line 51, after “connected to disks (13)” delete “12'”.

Column 2, line 55, after “swivelling axis 22 of the locking hook 21 are” delete “22”.

Column 3, line 40, after “FIG.” delete “28” and insert in its place --2B--.

Signed and Sealed this

Twenty-first Day of September, 2010

David J. Kappos
*Director of the United States Patent and Trademark Office*